Fig. 1.

C. A. REINERS.
ELEVATOR SIGNALING APPARATUS AND CIRCUITS THEREFOR.
APPLICATION FILED FEB. 1, 1912.

1,219,775.

Patented Mar. 20, 1917.
6 SHEETS—SHEET 4.

UNITED STATES PATENT OFFICE.

CHARLES A. REINERS, OF HOBOKEN, NEW JERSEY.

ELEVATOR SIGNALING APPARATUS AND CIRCUITS THEREFOR.

1,219,775.        Specification of Letters Patent.       Patented Mar. 20, 1917.

Application filed February 1, 1912. Serial No. 674,643.

*To all whom it may concern:*

Be it known that I, CHARLES A. REINERS, a citizen of the United States, residing at Hoboken, in the county of Hudson and State of New Jersey, have invented certain new and useful Improvements in Elevator Signaling Apparatus and Circuits Therefor, of which the following is a clear, full, and exact description.

This invention relates to improvements in an elevator signaling apparatus and circuits therefor and is more particularly concerned with that type of apparatus having a series of electrically operated signaling devices for each car, one signaling device for each floor, combined with mechanism for operating the same in each direction of movement of the car by means of "up" and "down" controllers at each floor adapted to be operated by intending passengers and generally known as "passengers' buttons."

The object is to improve and simplify the construction of such an apparatus and particularly to so arrange the circuits that a great saving of wiring and other parts is effected over the installations heretofore known.

A further object is to provide a signaling device which will indicate both for an "up" and "down" movement of the car giving a distinguishing signal for each movement and adapted to be operated by a single circuit so that for any series of said signal devices it is only necessary to have one wire leading to each signaling device of the series and a common return for them all.

A further object of the invention is to transmit to the signaling devices currents of different character so as to cause the signaling device to operate differently for each different character of current passing therethrough. In the preferred embodiment of my invention herein shown, the signaling device is adapted to give an "up" indicating signal when current passes therethrough in one direction and a "down" indicating signal when current passes therethrough in the other direction. I have shown two forms of signaling devices suitable for accomplishing this result, one comprising a polarized relay for closing a circuit through separate lamps and another device comprising an oscillating drum adapted to be operated by a solenoid and a magnetized core.

In the present apparatus I also preferably employ a commutator device for each car and traveling therewith at a proportionate rate thereto for closing contacts in the signaling circuits to the various signaling devices in succession. An additional signal in the car is also preferably arranged to be operated with each signaling device of the several floors and the commutator device and its connections are arranged so as to operate the signal in the car shortly before the car reaches the floor and to operate the signal on the floor some time before the car signal is operated. In the preferred embodiment shown, the signaling device on the floor is operated three floors in the travel of the car before the car signal is operated.

The commutator device is arranged not only to close contacts in the circuits for the several signaling devices in succession as the car travels from floor to floor but is also arranged to change connections from one side of said circuits to different poles of a source of current dependent upon which way the car is traveling and for the convenience of terminology may be termed a "pole changing commutator." Whenever the pole changing commutator makes a change of connections for changing the polarity at one side of the circuits to the signaling devices a common-return pole changer simultaneously makes a change of connections for changing the polarity at the other side of said circuits so as to provide for a change in the flow of current therethrough. Although there is a single signaling device for each floor for each car directional means are provided to cause an up going signal to be received only by an up going car and vice versa and thus prevent false signals being given when there are a plurality of cars in operation.

A further object of the present invention is to provide restoring mechanism for canceling a signal of said signaling devices whenever a car has responded to said signal, for example, by stopping to take on the passenger. This restoring mechanism is operated automatically when the car stops to take on the passenger without any special intervention on the part of the operator of the car other than his usual operation of said car to take on the passenger who is calling him. The restoring mechanism is also controlled by directional means to prevent an up going car from restoring signals intended for down going cars and vice versa. The operation of the restoring mechanism is further dependent upon the presence of a car at the exact floor from which the signal is given so that unless a car comes to that floor in the direction called for no restoration takes place but signals will be given to following cars until one does come to that floor and stops to take on the passenger.

A further object of the invention is to provide means whereby the operator of any car may cut out all the signals for his car, and run up and down the shaft without receiving any signals or giving any signals to the intending passengers on the floors.

A still further object of the invention is the provision of devices conveniently located and easily operable at the several floors to allow the car to run express between certain floors without receiving or giving signals and yet receive and give signals for other floors. With these and other objects in view which will become apparent from the following specification and claims, I have devised a preferred embodiment of my invention illustrated in the accompanying drawings in which—

Figures 3, 5, 6, 7:
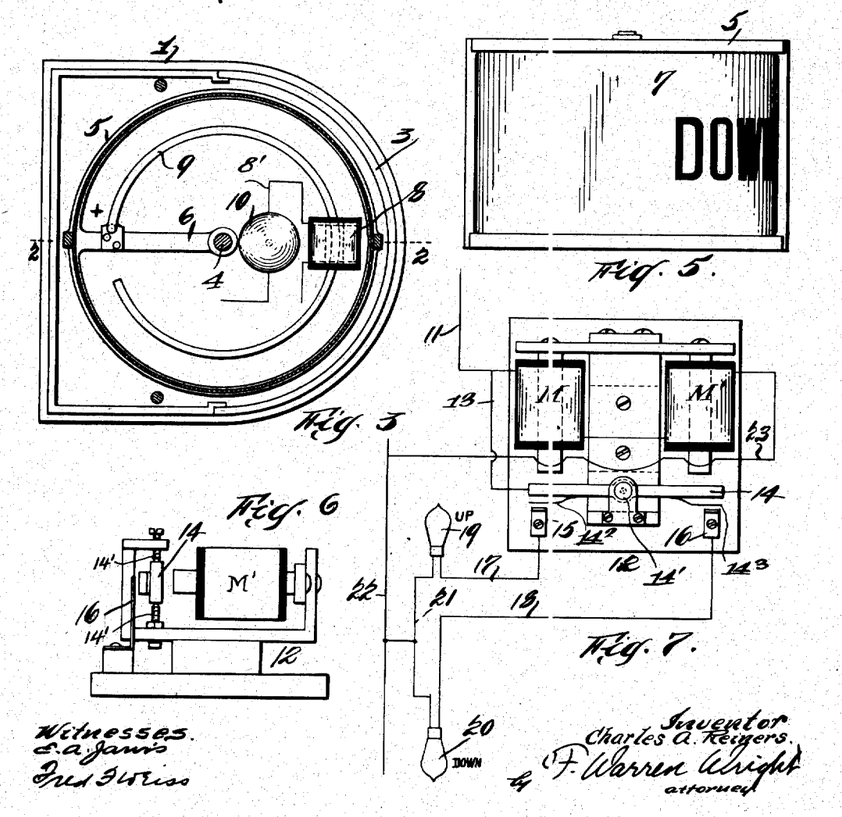
Fig. 3 is a sectional plan taken on line 3—3 Fig. 2.
Fig. 5 is a view similar to Fig. 4 with the word "Down" coming into position.
Fig. 6 is a side elevation of a polarized relay to be used in a modified form of signaling device.
Fig. 7 is a plan view of the relay of Fig. 6 connected up with a circuit diagram showing the one circuit adapted to control by aid of said polarized relay the two lights.
Figure 4:
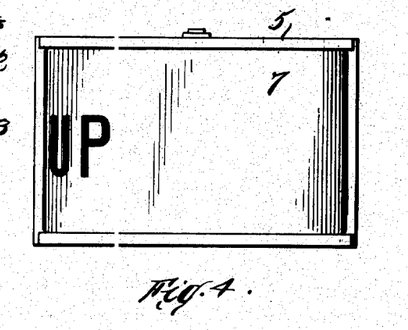
Fig. 4 is a front elevation of the signaling drum shown in Fig. 2 with the word "Up" coming into position.

I will first describe the electrically-operated signaling devices designed to be placed at the different floors of a building, one series for each elevator shaft, and adapted to give either an up or a down signal, depending upon the direction of the current therethrough. I have shown two suitable forms of such a signaling device, and Figs. 2, 3, 4 and 5 illustrate one form thereof. Referring to said figures, a casing provided with a base 1, has a top 2, and a transparent glass front 3. Centrally mounted within this casing is a rotatable spindle 4 adapted to oscillate on its bearings, and fixed to this spindle is a radial arm 6 carrying a drum 5 having a translucent side 7, preferably of celluloid. This celluloid side is marked with the words "Up" and "Down" so placed, that upon the oscillation of said drum either word may be brought to the front of the casing behind the glass 3. Within the casing is fixedly mounted a solenoid 8, and fixed to the radial arm 6 of the drum spindle 4 is a core 9 passing through said solenoid. This core is nearly a complete ring of permanently magnetized iron, so that when current passes through the solenoid 8 in one direction, the core will be moved therethrough so as to rotate the drum in a clockwise direction, as shown in Fig. 5, to bring the word "Down" into exposed position at the front of the casing, and when current is passed through the solenoid in an opposite direction, the core will be moved oppositely so as to rotate the drum in a contra-clockwise direction and bring the word "Up" into exposed position at the 125 front of the casing, as shown in Fig. 4. It will be noted that only a single circuit is necessary to operate the solenoid 8, and the wire 8' for this circuit is also led through a lamp 10 for illuminating the translucent drum so as to make the signs thereon show through the glass front of the casing. It is preferable not to pass too heavy a current through the solenoid 8, for with too great a flow of current there would be a tendency to overcome the polarity of the permanent magnet.

In Figs. 6 and 7 is illustrated another type of signaling device, which comprises a polarized relay 12 arranged to operate two different signaling lamps 19 and 20 and marked "Up" and "Down" respectively. This polarized relay consists of the usual magnets M and M', together with the polarized armature 14 pivoted at 14'. The energizing current for operating the relay passes from wire 11 through magnets M and M', and out wire 23 to return-line 22. A shunt 13 is led around the magnets from wire 11 to the polarized armature 14. The separate contacts 15 and 16 beneath the polarized armature 14 lead respectively through lines 17 and 18 to the up-light 19 and the down-light 20, and a common-return 21 for both of said lights is led to the wire 22. It will be obvious that when the current passes through the magnets of the relay in one direction, the armature 14 will be oscillated upon its pivot so as to close one of its contacts 15, for instance, and thus cause the up-lamp 19 to be lighted, and when the current passes through the magnets in the other direction the armature 14 will close the other contact 16 and light the down-light. It will be observed that only a single leading-in wire 11 is required for the signaling device and that the lamps are energized from this same circuit by means of the shunt 13 connected around the magnets. Contact springs $14^2$ and $14^3$ are preferably provided at the end of the armature 14.

Figure 1:
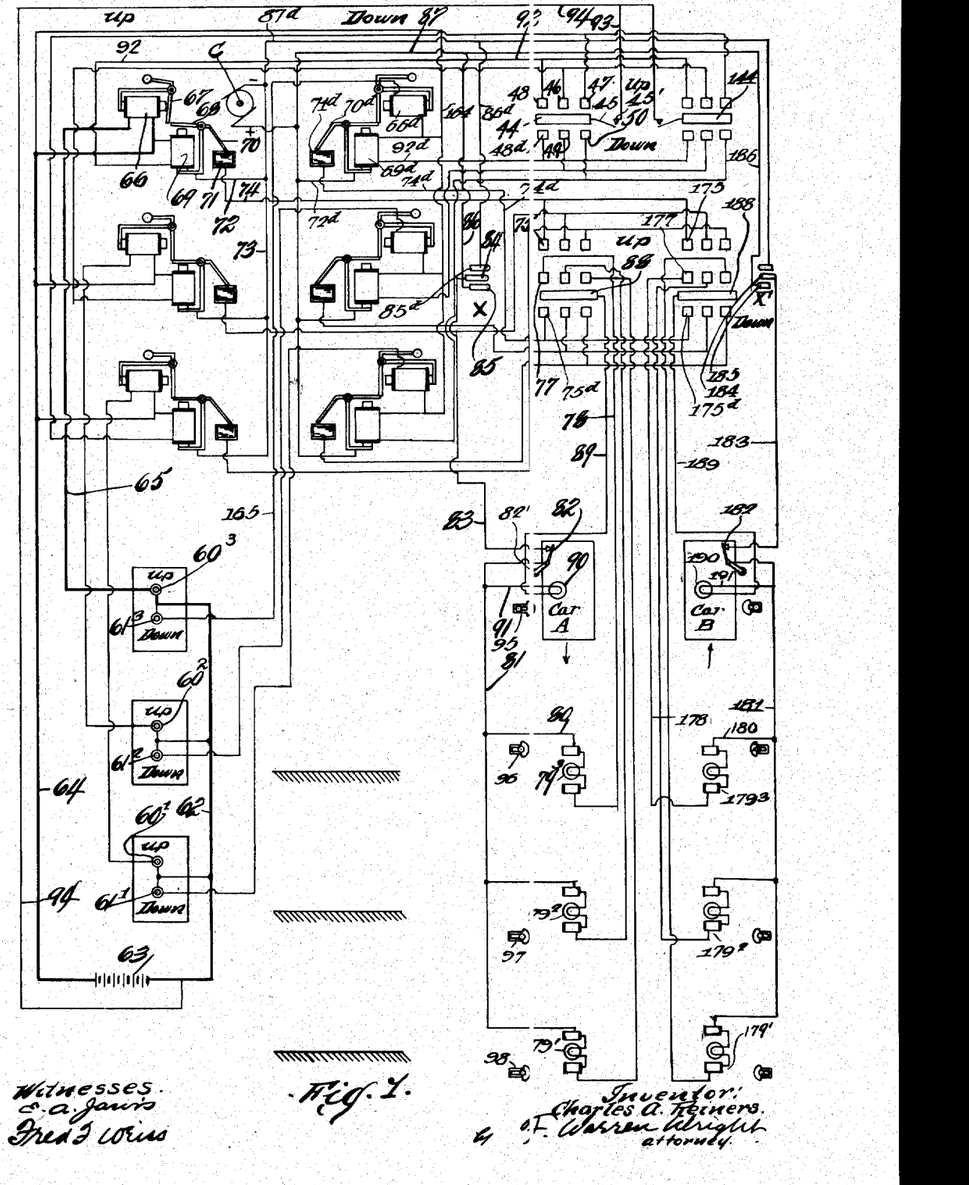
Figure 1 is a diagram of my signal apparatus and circuits shown in conventional manner.
Figure 2:
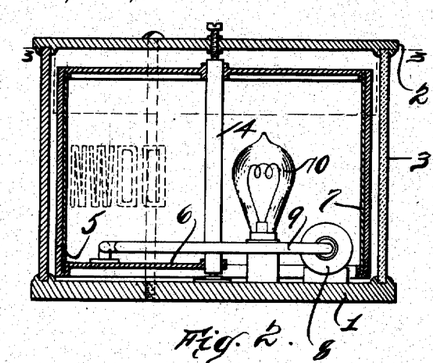
Fig. 2 is a central section of one form of up and down signaling device, taken on line 2—2 Fig. 3.

Referring to Fig. 1, this shows a complete diagram of circuits for two elevator cars marked A and B and three floors of a building. At the different floors in front of the shaft of car A are located the signaling devices $79^3$ at the third floor, $79^2$ at the second floor, 79' at the first floor, and in front of the shaft of car B are located the signaling devices indicated at $179^3$ at the third floor, $179^2$ at the second floor, and 179' at the first floor. The several signaling devices are merely shown diagrammatically in Fig. 1. Each car is also preferably provided with an additional signaling element therein, such as a lamp 90 for car A and 190 for car B. At each floor of the building are also arranged the up and down passenger-buttons, indicated at 60', 61' for the first floor, $60^2$, $61^2$ for the second floor and $60^3$, $61^3$ for the third floor.

For operating the several signaling devices from the passenger-buttons on the floors I have preferably provided magnetically-operated switch mechanisms, one associated with each passenger-button, comprising the usual setting magnet 66 and restoring magnet 69 and mercury pot 71 shown as associated with the up passenger-button $60^3$, which switch mechanisms are well known to those familiar with this art and may for convenience be termed "potential signaling means." A similar switch mechanism, comprising setting magnet $66^d$, restoring magnet $69^d$ and mercury pot $71^d$, is associated with the down passenger-button $61^3$, and it is understood that further switch mechanisms are provided, one for each up passenger-button and one for each down passenger-button. The up switch mechanisms are shown at the left in the column indicated "Up," and the "down" switch mechanisms are shown at the right in the column indicated "Down."

Associated with each elevator, and preferably located at the top of the shaft in what is known as the overhead mechanism, is a commutator device of special construction, which will be hereinafter described. This commutator device, to which I have given the name pole-changing commutator, is adapted to coöperate with the switch mechanisms of the passenger-buttons to energize the several signaling devices in accordance with the movement of the car and its direction of travel. The signaling devices for each car have a single wire leading to a contact at the pole-changing commutator for that car. For example, signaling device $79^3$ has a wire 78 leading to contact 77, where the pole-changing commutator for car A is located but is not shown in this diagrammatic view of Fig. 1 for the sake of clearness. Similarly, each of the other signaling devices $79^2$, 79' have a wire leading to contacts in the same horizontal row as contact 77. Each of the signaling devices $79^3$, etc., is connected to a common-return wire 81, such as by wire 80, which return wire is connected through a switch 82 in the car and then to wire 83 leading to the overhead mechanism at the top of the shaft, where it is connected to a contact 84 located at a common-return pole-changer, which will be described more particularly hereinafter. At one side of this contact 84 is a contact 85 connected by wire 86 and 87 to the positive side of a source of current C, and at the other side of the contact 84 is a contact $85^d$ connected by wire $86^d$, $87^d$ to the negative side of the source of current C. The switch arms, such as 70, of each of the up magnetically-operated switch mechanisms are connected, such as by wire 72, to the negative side of the source of current, while the switch arms $70^d$ of the down magnetically-operated switch mechanisms are connected by wires, such as $72^d$, to the positive side of the source of current. The mercury pots of the up magnetically-operated switch mechanisms, such as 71, are connected through wires such as 74, to contacts such as 75, located in a row above the previously mentioned contact 77. The mercury pots 71$^d$ of the down magnetically-operated switch mechanisms are connected by wires such as 74$^d$, to contacts such as 75$^d$, forming a row below the row of contacts 77. From this construction it will be obvious that if the contacts of the row 77 are successively bridged with the associated contacts 75 of the row above by the pole-changing commutator, and the common-return pole-changer bridges contact 84 with contact 85, then circuits can be completed through the signaling devices only by operating the up magnetically-operated switch mechanisms, which in turn are actuated by the up passenger-buttons. If the contacts 77 are successively bridged with the contacts of the lower row 75$^d$ for instance, and contact 84 is bridged with upper contact 85$^d$, then the signaling devices can only be operated by the down passenger-buttons. It will further be observed that when the up passenger-buttons are actuated to send the current through the signaling devices, the terminals of the signaling circuits are connected to the positive and negative side of the source of current so as to send the current therethrough in one direction, but when the down passenger-buttons are operated to send a current through the signaling devices, the circuits of these signaling devices have their terminals connected to the opposite poles of the source of current so that the current passes therethrough in an opposite direction. It will now be clear how the apparatus is arranged to give an up going signal when an up passenger-button is operated, and a down-going signal when a down passenger-button is operated.

Associated with the contacts of each pole-changing commutator are contact strips such as 88 and 188, adapted to be connected to the source of current when the contacts of the middle row such as 77, are connected either to the upper row such as 75, or the lower row such as 75$^d$. In other words, the contact 88 is connected in circuit both when up-signaling currents and down-signaling currents are to be given to the signaling devices and the wire 89 leads from this contact 88 to a signal lamp 90 in the car A, which lamp has a return wire 91 connected with a common-return 81 of the signaling devices. In this way the lamp 90 of the car is connected in shunt to each of the signaling devices of that car whenever it is operated and no matter whether it is operated for an up or a down signal, thus giving to the operator of the car a notice that his car is wanted at a certain floor. In each car such as car A, there is also provided a cutout switch indicated at 82, which is included in the common-return circuit of the wires 81 and 83, so that whenever switch 82 is open the return for all of the signaling devices of that car and of the lamp 90 in the car is broken, and consequently no signals can be given to the signaling devices on the several floors of that car shaft, nor to the car itself.

Figure 14:
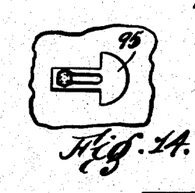
Fig. 14 is a detailed view in side elevation of a cam device comprising part of the adjustable means for enabling the car to run express.

In order to enable the car to run "express" between certain floors without either giving or receiving signals and yet to run "local" for other floors so as to receive and give signals, I have provided a simplified construction which avoids the cumbersome and expensive method of changing connections in the overhead mechanism and which may be easily and conveniently adjusted by the car operator, or anyone else detailed for this work. This construction comprises devices located at each floor coacting with the cutout switch 82 of the car, above described. In my preferred embodiment I have mounted slidable cam devices 95, 96, 97, 98, one at each floor, and adapted to be adjusted so that their cam faces stand in the path of the roller 82' of the switch arm 82. Whenever a cam device such as 95, is thrown to the right, it is adapted to stand in the path of said roller 82' and cause the switch arm 82 to open when the car passes below that floor and to close when the car passes above that floor. The switch arm is adapted to remain in its open position until positively closed, and therefore during the entire time that the car A is below the cam 95, no signals can be given or received by that car. In other words, the car can run "express" at the floors below the cam 95. By adjusting the other cams it is obvious that the express service may be divided among the floors in any desirable way. The switch 82 in the car may also be operated by the car operator to open the circuit when he desires to run express or to pass any floors without receiving or giving signals.

The means for canceling signals after they have been given and restoring the parts to condition for receiving new signals, generally known as the restoring mechanism, is arranged in the present invention so that the signal will not be canceled unless a car, coming from the direction called for, stops at the floor to take on the passenger. This restoring mechanism is preferably connected with a commutator device so as to restore only when the car actually comes to the floor from which the call was initiated and stops to receive the passenger.

The restoring magnets such as 69, of the up magnetically-operated switch mechanisms, are connected at one side to the battery 63 as by wire 64, and at the other side as by wire 92 to contacts such as 48, 46 and 47, forming an upper row in Fig. 1. The down restoring magnets such as 69$^d$ are likewise connected at one side to the battery 63 as by wires 164, 64, and at their other side as by wire 92ᵈ, to contacts such as 48ᵈ, 49 and 50, forming a lower row in Fig. 1. Similar connections and contacts are provided for a commutator of each of the other cars. Between the upper and lower rows of contacts, just described, is located a continuous contact strip 44 connected through a normally open switch 45, 45′ to wires 93, 94 leading to the other side of the battery 63. It is understood that a commutator device traveling with the car at a proportionate rate thereto, is adapted to pass over the contacts, and depending upon the direction of the car is adapted to close the contact strip 44 successively either with the contacts of the upper row 48, 46, 47, or with the contacts of the lower row 48ᵈ, 49, 50. When the car is going up this commutator device is arranged to close the contact strip 44 with 48 for instance, and provided switch 45, 45′ is closed, complete a circuit through the restoring magnet 69 of the up magnetically-operated switch mechanisms. When the car is going down, the commutator device similarly completes a circuit through the contact 48ᵈ of the down magnetically-operated switch mechanism. The switch 45, 45′ is adapted to normally stand open while the car is moving, and to be closed automatically whenever the car stops. The details of this normally-open restoring switch, and of the commutator device for the restoring contacts, and of the pole-changing commutator, and of the common-return pole-changer, will now be described.

Figure 8:
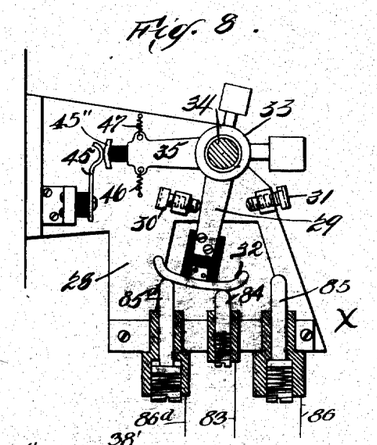
Fig. 8 is a detail in end elevation of the common-return pole-changer and my preferred means for causing a restoring of signals upon the stopping of a car at a floor.
Figure 9:
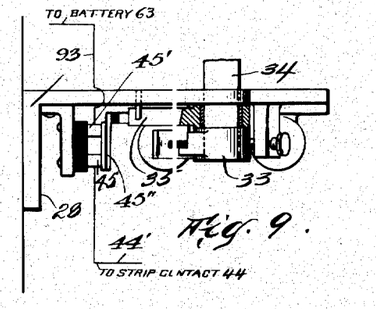
Fig. 9 is a plan for Fig. 8 with parts in section.

Referring more particularly to Figs. 8 to 13 inclusive, in Fig. 8 is shown the common-return pole-changer and the normally-open restoring switch. Frictionally mounted upon the rotating shaft 34, which shaft is operated in unison with the elevator-car, are arms 35 of the normally open restoring switch and 29 of the common-return pole-changer, said arms being separate from one another. 33 indicates the bearing sleeve for arm 29, and stops 30 and 31 are provided to limit the swinging movement of said arm 29. The arm 29 carries at its lower end and insulated therefrom, a conducting shoe 32 which is adapted to bear down upon and form a connection between contacts 85ᵈ and 84, or between 84 and contact 85. These contacts are preferably spring-pressed upwardly so as to maintain good contact with shoe 32. The circuit connections to these contacts have been previously described. When the elevator car is traveling in one direction, down for instance, the arm 29 is thrown by its frictional engagement with the shaft 34 into the position shown, and when the elevator car is running in the other direction the arm 29 is thrown into its opposite position to close contacts 84 and 85. The arm 35 also frictionally mounted upon shaft 34, is entirely independent of arm 29, and when said shaft 34 is stopped, said arm 35 is held in the position shown, by means of two tension springs 46, 47, one at each side thereof, so that its insulated conducting shoe 45″ will make a connection between the separated contacts 45, 45′, as shown in Fig. 9. Wire 44′ leads from contact 45 to the continuous contact strip 44, and wire 93 leads from contact 45′ to one side of the battery 63.

Figure 10:
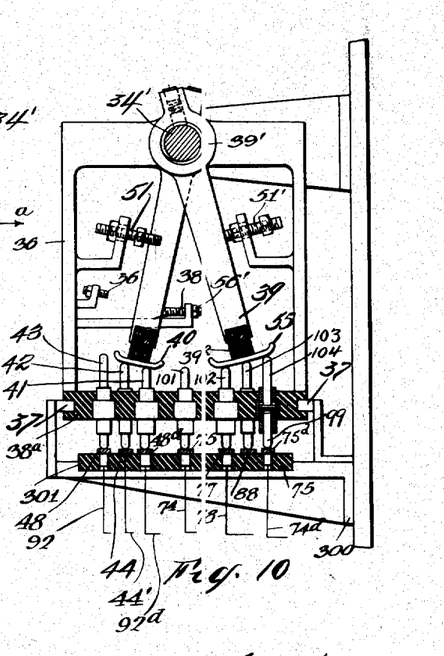
Fig. 10 is an end elevation partly in section of the pole-changing commutator device.
Figure 11:
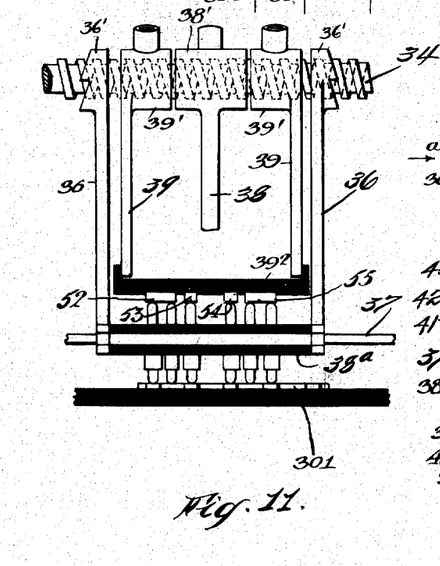
Fig. 11 is a side elevation of Fig. 10 looking in the direction of arrow *a* with part broken away.

At another portion 34′ of the shaft 34, which latter portion is provided with a screw thread, is mounted the pole-changing commutator and the separate restoring commutator, shown in Figs. 10 and 11. Upon the screw 34′ is carried a frame consisting of side arms 36 and threaded sleeves 36′ embracing the screw 34′ so as to carry said frame back and forth along said screw as the screw is rotated in one direction or the other. The lower end of the frame 36 carries an insulating plate or plunger board 38ᵃ grooved at its sides so as to run in guides 37 of the supporting base 300. Mounted in the plunger board 38ᵃ of the frame are a plurality of contact plungers such as 41, 42, 43, 101, 102, 103, 104. These plungers each have an upper portion illustrated at plunger 104, Figs. 10 and 13, and lower portion 99 normally forced apart by a spring 100, as clearly shown in section in Fig. 13. The supporting base 300 carries an insulating table 301 upon which the contact strips and the rows of different contacts for the different floors of the building are mounted, and over which in a lengthwise direction the frame 36 with its plunger board and contact plungers is adapted to travel, as clearly illustrated in Fig. 12.

Figure 12:
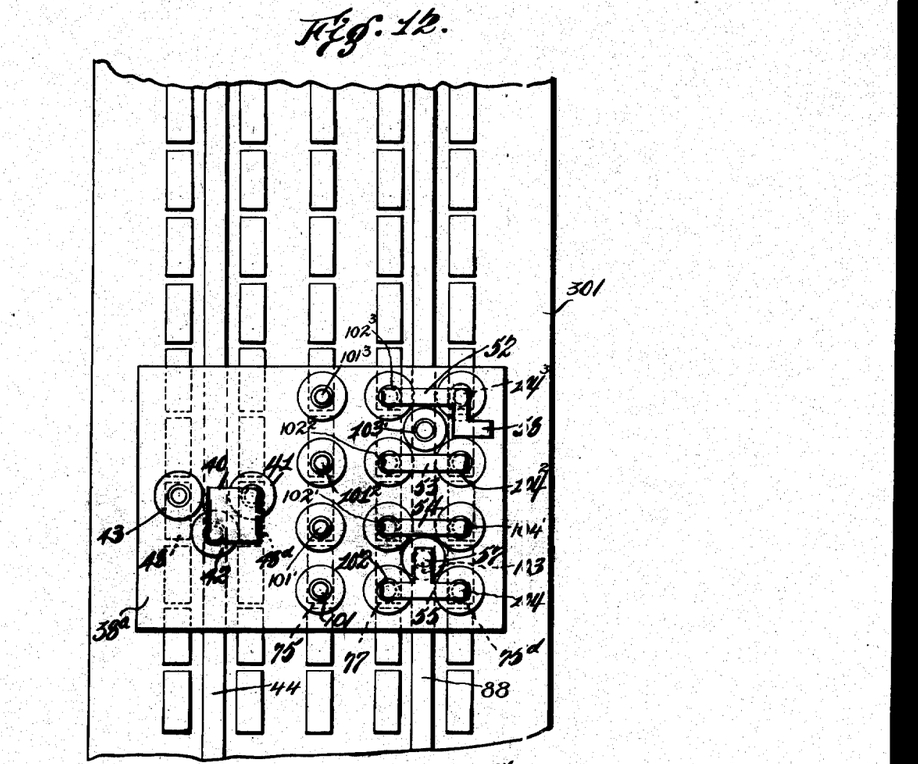
Fig. 12 is a schematic view in plan showing a portion of the contact supporting table of the commutator device, with the plunger board located above the same and the conducting shoes in position for closing certain contacts.
Figure 13:
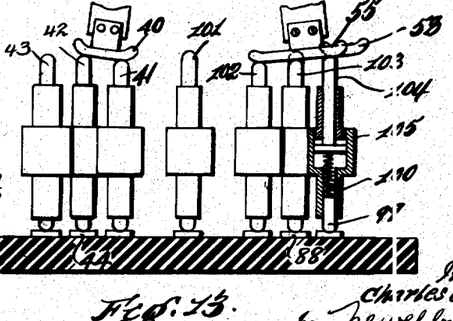
Fig. 13 is an enlarged view of the contacts and contact plungers such as shown in Fig. 10, the lower part only being shown in this figure and the plunger table being omitted.

Within the frame 36 are two oscillating shoe carriers, one comprising side arms 39 having sleeves 39 screw-threaded on the shaft 34′ forming part of the pole-changing commutator, and the other comprising an arm 38 having a sleeve 38′ screw-threaded on the shaft 34′ forming part of the restoring commutator. These arms are thus caused to travel with the frame 36 during the rotation of the shaft 34′, and, moreover, to be swung from one side to the other, dependent upon the direction of rotation of said shaft due to the frictional engagement between the shaft and the sleeves. Stops 51 and 51′ are provided to limit the throw of the arms 39, and stops 56, 56′ are provided to limit the throw of arm 38. The oscillating arms 39 carry at their lower ends a transverse member of insulation 39² on which are mounted four separate conducting shoes 52, 53, 54 and 55, as shown in Fig. 11, and the arm 38 carries at its lower end and insulated therefrom, a single conducting shoe 40. Viewing Fig. 12 in one aspect, these various contact plungers may be considered as forming longitudinal rows, contact plungers 101, 101′, 101², 101³ forming one row, contact plungers 102, 102', 102², 102³ another row and contact plungers 104, 104', 104², 104³ still another row. Contact plungers 103, 103' may also be considered as forming an intervening longitudinal row of two plungers. Each longitudinal row of contact plungers together with the single plungers 41, 42 and 43, are carried by the supporting plunger board 38ª lengthwise of the table 301, so as to pass successively over the contacts of each respective line and the contact strips. The contacts, such as 75, 77 and 75ᵈ, 48 and 48ᵈ of each line are separated and insulated from another by a narrow intervening space whereby the contact plungers of a row in traveling over each contact will have a continuous engagement therewith; each following contact plunger coming upon the contact before the advancing plunger leaves it, so as to maintain a continuous circuit during the travel of the row of contact plungers over each contact. The length of the contacts, of course, varies with the relative travel of the plunger board with respect to the travel of the elevator and is determined primarily by the distance between the floors of the building. The lateral gaps between contacts of different lines and the contact strips are bridged when the upper ends of the contact plungers are connected by the conducting shoes 40, 52, 53, 54, 55, as will be obvious. Thus there are four conducting shoes on arms 39 as described, for engaging the four contact plungers of two parallel rows at a time and thus bridging the contacts which lie beneath said plungers. Referring to Fig. 12, conducting shoe 55 has an intermediate extension 57 adapted to engage the plunger 103 at the same time that plungers 102 and 104 are engaged by said shoe. This engagement of the plungers 102, 103 and 104 by the shoe 55 and its extension 57 bridges the contact 77 with the strip 88 simultaneously with contact 75ᵈ (see also Fig. 1), and thus completes the car-light circuit 89 for signal 90 of the car at the same time that the floor signaling circuit is completed. For instance, under these conditions if a down push-button has been operated on the third floor corresponding to contact 75ᵈ, a signal will appear both at the third floor and also in the approaching car. Shoe 52 also has an offset extension 58 adapted, when the car is going in the opposite direction and the conducting shoes have been thrown laterally toward the left from the position shown in Fig. 12, to simultaneously engage plunger 103' with plungers 101³ and 102³ and thus in a similar manner bridge a contact of row 77 with the strip 88 to complete a signal in an up-going car at the same time that a floor signal is given by said car.

The four plungers of each longitudinal row thus described are arranged to ride along above the table 301 for successive engagement with the corresponding line of contacts below the same, and said plungers are always in engagement with four successive contacts in a line at the same time. Therefore the four conducting shoes 52, 53, 54 and 55 are adapted to bridge the contacts for four different floors at the same time and thus complete the circuits for the signaling devices at those floors. This enables each car approaching any particular floor to complete a signal to that floor when at least three floors away. In other words, an intending passenger operating a passenger-button on any particular floor is given ample notice that the elevator is approaching his floor.

In the present embodiment, the car operator is notified of an intending passenger's call when his car is only one floor away. Therefore although there are four shoes to give advance signals to the intending passenger, only the rearmost or trailing shoe is provided with means to complete the car-light signal to the car operator. When the car is going down, shoe 55 acts as a trailing shoe and by its intermediate extension 57 is adapted to complete the car-light circuit as above described, three floors later in the travel of the car than the time when the floor light circuit is initially completed by the leading shoe 52. Similarly, when the car is going up, shoe 52 acts as the trailing shoe and by its offset extension 58 (the shoes having in the meanwhile been thrown to the left from the position shown in Fig. 12) is adapted to give the car-light signal three floors later than when the floor signal is first given. Obviously, the timing of signals either to the car or to the floor is a matter of choice and may be varied to suit requirements.

It will be clear from Figs. 10 and 12 how the shoe 40 carried on arm 38 is moved laterally to connect plunger 42 alternately with plungers 41 and 43 for bridging the intermediate strip contact 44 with the up and down lines of contacts, 48 and 48ᵈ for the restoring circuit, depending upon the direction of the car's travel.

Operation.

Referring to the diagrammatic figures, particularly Figs. 1, 15, 16 and 17, I will now describe the operation of the apparatus. Assuming that car A is going down and car B is going up, I will first take a case in which a passenger on the third floor has pushed an "up" passenger button. The circuit through the "up" passenger button 60³ is shown in heavy black lines in Fig. 1 through line 62, battery 63, line 64, up setting magnet 66, and line 65, back to the button. The energization of this magnet attracts its armature 67 and releases arm 70 causing it to dip into mercury pot 71 and thus close the switch for setting a latent signal ready to be picked up when the circuit is completed by the commutator device upon the approach of a car in the right direction. The arm 70, as before described, is connected by line 72 with the negative side of the source of current C. The mercury pot 71 is connected by line 74 to contact 75 of car A and contact 175 of car B. Since car A was assumed to be going down, its pole changing commutator will not be in position to close the contacts 75 with 77 or any other contacts of these rows, and thus none of the up signaling circuits for this car can be operated. The pole changing commutator for car B, however, is in position to close contact 175 with 177 through a shoe such as 155, (indicated only in diagramatic view Fig. 17) when the car approaches that floor. The circuit is therefore continued through contact 177, line 178, signaling device $179^3$, line 180, common return wire 181 through cut out switch 182 in car B and up through line 183 to contact 184 of the common-return pole changer X'. The upward travel of car B has caused this common-return pole changer to close contact 184 with the lower contact 185 and from this contact the circuit is continued through line 186, line 87 to the positive side of the source of current thus completing the circuit and energizing the signaling device $179^3$ on the third floor. This signaling device, of course gives an "up" signal on account of the passage of the current therethrough in the direction described. Just before car B has arrived at the floor and while the pole changing commutator is closing contacts 175 with 177, it also closes contact 175 with contact strip 188 to send a shunt current through line 189 to the lamp 190 in car B and out through line 191 to the common-return 181, thus giving a signal in the car that a passenger is calling.

Assuming now that a "down" passenger button on the third floor has been pushed, a circuit is closed from the battery 63 through line 62 to the "down" passenger button $61^3$ and by wire 165 to the down setting magnet $66^d$ thence by wire 164 to return wire 64 and battery 63. The setting magnet $66^d$ in a similar manner releases arm $70^d$ so that it falls into the mercury pot $71^d$ and closes a switch for the down setting circuit to the various down contacts for the commutators for the different cars. The arm $70^d$ is connected by line $72^d$ to the positive side of the source of current C, and the circuit is continued from mercury pot $71^d$ through line $74^d$ to contact $75^d$. The pole changing commutator for car A is in position to close contact $75^d$ with contact 77 when the car approaches the third floor going down and the circuit is continued through contact 77, line 78, to the signaling devices $79^3$ at the third floor and out through line 80 to return wire 81, cut out switch 82 in car A, wire 83 to center contact 84 of the common return pole changer. This common return pole changer 70 is in position, due to the direction of movement of the car, to close contact 84 with $85^d$ and thence the current flows through line $86^d$, $87^d$, to the negative side of the source of current completing the circuit and operating the signaling device $79^3$. The pole changing commutator for car A, has also connected contact 75 with contact strip 88 to send a shunt circuit through the lamp 90 in car A and signal to the car operator that a passenger is calling, this shunt circuit being completed from contact 88 through line 89, the lamp 90, line 91 to return 81. In this way an "up" going passenger has signaled car B and has been notified by the signaling device on the floor that car B is approaching and a "down" going passenger has sent a signal to car A and has been notified by the signal device on the floor that car A is approaching to take him aboard. Assuming now that car A has taken its passenger, the circuits for the restoring means of the signals given for this car will now be described.

Operation of restoring circuit.

The signaling device $79^3$ is restored by the restoring magnet $69^1$ which, when energized, attracts its armature and lifts arm $70^d$ out of mercury pot $71^d$. This will break the circuit through the signaling device $79^3$ as well as lamp 90 in the car, and thus cancel them both. The restoring circuit through magnet $69^d$ is traced as follows: from battery 63 through line 64, line 164 to the restoring magnet $69^d$ and line $92^d$ to contact $48^d$. The restoring commutator is in position to close contact 44 and $48^d$ as shown in Figs. 10 and 12, and the circuit is continued through 44 to the normally open break 45, 45'. This break, however, as previously described, is closed by the normally open switch arm 45'' whenever the car stops so that the circuit is completed through line 93, 94 back to the battery. It will be obvious that the signaling device for other cars and for other floors may be restored in a similar manner.

Figure 15:
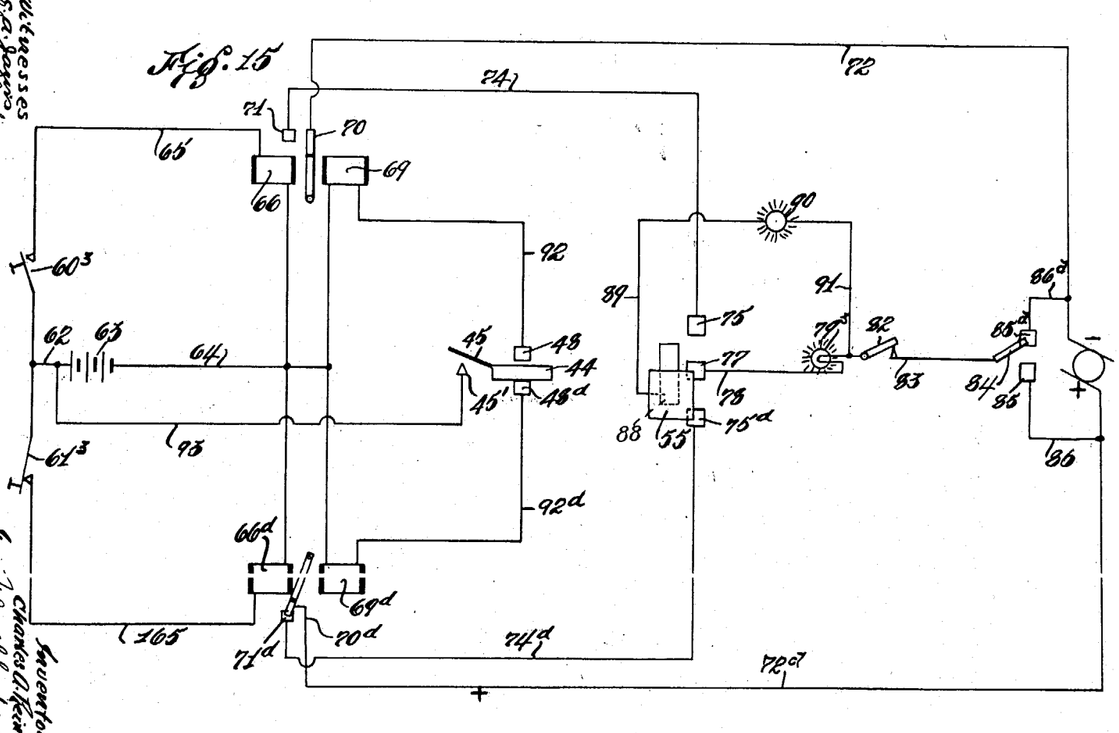
Fig. 15 is a simplified diagram of the circuits for one signaling device at one floor, together with connections to the up and down passenger-buttons for that floor, the circuit for the down passenger-button being closed.
Figure 16:
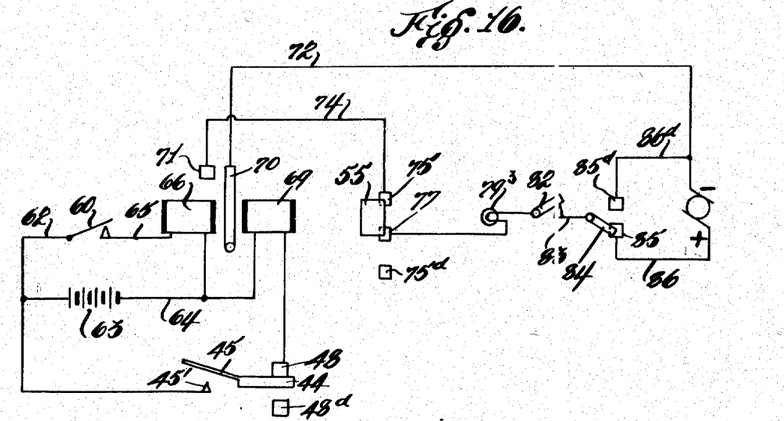
Fig. 16 is a still further simplified diagram showing the circuit connections to the signaling device for one floor and for one direction of movement of the car.
Figure 17:
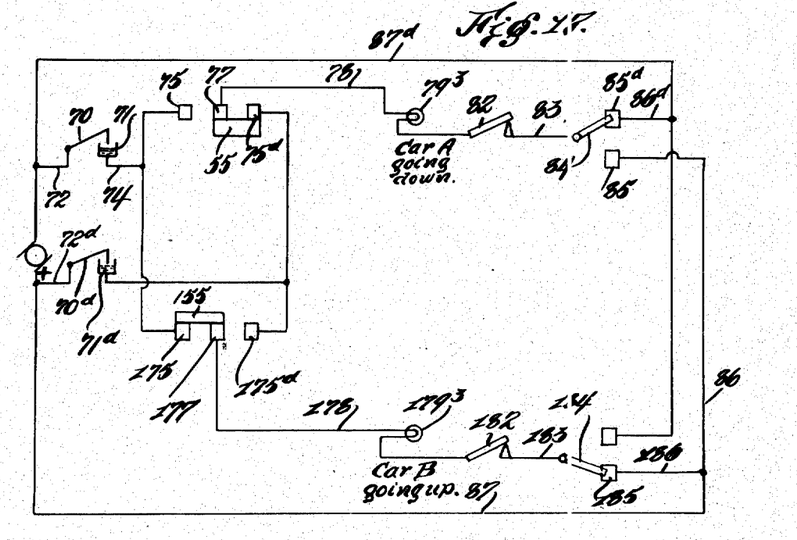
Fig. 17 is a simplified diagram showing the signaling circuits for one floor to the signaling devices of two different cars so as to illustrate in a simplified manner the directional means for preventing an up signal from being given to a down-going car, and vice versa.

Referring to the diagrammatic view of Fig. 15 I have shown in simplified form signaling circuits for one car closed for operation by a "down" passenger-button on the third floor, as above described, while the signaling circuits for the "up" passenger-button on that floor are open. Fig. 15 also shows the down restoring circuit for the signaling device closed except for the normally-open switch 45, 45', which is closed when the car stops. In Fig. 16 I have shown in still further simplified form a signaling circuit for one car adapted to be operated by an "up" passenger-button at one floor, the car light circuit being omitted. In the simplified diagram of Fig. 17 I have shown a portion of the signaling circuits for two cars leading from the mercury pots of an "up" and a "down" passenger-button at one floor, and, as above described, the connections are made with the assumption that car A is going down and car B is going up. The positions of the conducting shoes 55 and 155 of the pole-changing commutators for each car show clearly how false signals are prevented; in other words, how a signal for an "up" going car will not be given to a "down" going car.

I am aware that my invention may be embodied in various other forms than the one herein illustrated, and I do not wish to be limited to the preferred construction which I have shown and described.

What I claim as new is:—

1. In an elevator signaling apparatus in combination, a car, a signaling device for each of a plurality of floors, means for operating said signaling devices comprising up and down passenger-buttons at each floor, signaling circuits corresponding to said signaling devices, and circuit-controlling mechanism operated by the car and coöperating with said up and down passenger-buttons to change the character of the current to be sent through said signaling device when the car changes its direction of movement.

2. In an elevator signaling apparatus in combination, a car, a signaling device for each of a plurality of floors, means for operating said signaling devices comprising up and down passenger-buttons at each floor, signaling circuits corresponding to said signaling devices, and circuit-controlling mechanism operated by the car and coöperating with said up and down passenger-buttons to cause current of one character to flow through said signaling device when said car is going up and a current of another character to flow through said signaling device when the car is going down.

3. In an elevator signaling apparatus in combination, a car, a signaling device for each of a plurality of floors, means for operating said signaling devices comprising up and down passenger-buttons at each floor, signaling circuits corresponding to said signaling devices, and circuit-controlling mechanism operated by the car and coöperating with said up and down passenger-buttons to change the character of the current to be sent through said signaling device when the car changes its direction of movement, said signaling device being provided with means to give a different indicating signal for each character of current flowing therethrough.

4. In an elevator signaling apparatus in combination, a car, a signaling device for each of a plurality of floors, means for operating said signaling devices comprising up and down passenger-buttons at each floor, signaling circuits corresponding to said signaling devices, and circuit-controlling mechanism operated by the car and coöperating with said up and down passenger-buttons to cause current of one character to flow through said signaling device when said car is going up and a current of another character to flow through said signaling device when the car is going down, said signaling device being provided with means to give up and down indicating signals in response to each different character of current passing therethrough and in accordance with the movement of the car.

5. In an elevator signaling apparatus in combination, a car, a signaling device for each of a plurality of floors, means for operating said signaling devices comprising up and down passenger-buttons at each floor, signaling circuits corresponding to said signaling devices, and circuit-controlling mechanism operated by the car and coöperating with said up and down passenger-buttons to change the direction of the current to be sent through said signaling device when the car changes its direction of movement.

6. In an elevator signaling apparatus in combination, a car, a signaling device for each of a plurality of floors, means for operating said signaling devices comprising up and down passenger-buttons at each floor, signaling circuits corresponding to said signaling devices, and circuit-controlling mechanism operated by the car and coöperating with said up and down passenger-buttons to change the direction of the current to be sent through said signaling device when the car changes its direction of movement, said signaling device comprising a polarized relay, and an up indicating signal actuated by one direction of current, and a down indicating signal actuated by the other direction of current therethrough.

7. In an elevator signaling apparatus in combination, a car, a signaling device for each of a plurality of floors, a single circuit for each signaling device, said signaling device adapted to give up and down signals, one signal when current passes through it in one direction, and the other signal when current passes through it in the other direction, and means for changing the direction of current through said signaling device.

8. In an elevator signaling apparatus in combination, two cars, and for each floor and corresponding to each car a single signaling device adapted to cause a signal to be given in each direction of movement of its car, a single circuit for said signaling device, means for operating the same in each direction of movement of the cars and comprising an "up" and a "down" passenger-button at each floor, and for such button, signal-controlling mechanism set whenever that button is operated and adapted to control the operation of the corresponding signaling devices for that floor, and for each car, switch mechanism automatically operated by that car and rendering the "up" passenger-button-set mechanisms incapable of controlling the operation of the said signaling devices corresponding to that car while that car is moving down, and restoring mechanism corresponding to each car for restoring the passenger-button-set mechanisms.

9. In an elevator signaling apparatus in combination, two cars, and for each floor and corresponding to each car a single signaling device adapted to cause a signal to be given in each direction of movement of its car, a single circuit for said signaling device, means for operating the same in each direction of movement of the cars and comprising an "up" and a "down" passenger-button at each floor, and for such button, signal-controlling mechanism set whenever that button is operated and adapted to control the operation of the corresponding signaling devices for that floor, and for each car switch mechanism automatically operated by that car and rendering the "up" passenger-button-set mechanisms incapable of controlling the operation of the said signaling devices corresponding to that car while that car is moving down.

10. In an elevator signaling apparatus in combination, two cars, and for each floor and corresponding to each car a signal signaling device adapted to cause a signal to be given in each direction of movement of its car, a single circuit for said signaling device, means for operating the same in each direction of movement of the cars and comprising an "up" and a "down" passenger-button at each floor, and for each button signal-controlling mechanism set whenever that button is operated and adapted to control the operation of the corresponding signaling devices for that floor, and for each car switch mechanism automatically operated by that car and rendering the "up" passenger-button-set mechanisms incapable of controlling the operation of the said signaling devices corresponding to that car while that car is moving down, and a commutator mechanism operated by that car and causing its signals to be given successively, and restoring mechanism corresponding to each car for restoring the passenger's-button-set mechanisms.

11. In an elevator signaling apparatus in combination, a plurality of cars, a signaling device for each floor and for each car, a single operating circuit for said signaling device, each adapted to cause a signal to be given in each direction of movement of its respective car and means for operating the same in each direction of movement of its car and comprising an "up" and a "down" passenger-button at each floor, mechanism for and independently set by each button, and a switch thrown by each car and coöperating with the up and down passenger-button set mechanism alternately to selectively determine the signals of each signaling device in accordance with the direction of movement of its respective car.

12. In an elevator signaling apparatus in combination, a plurality of cars, a signaling device for each floor and for each car, a single operating circuit for said signaling device, each adapted to cause a signal to be given in each direction of movement of its respective car, one signal for the up movement of the car and a different signal for the down movement of the car, and means for operating the same in each direction of movement of its car and comprising an "up" and a "down" passenger-button at each floor, mechanism for and independently set by each button, and a switch thrown by each car and coöperating with the up and down passenger-button set mechanism alternately to selectively determine the signals of each signaling device in accordance with the direction of movement of its respective car.

13. In an elevator signaling apparatus in combination, a car, a signaling device for each of a plurality of floors adapted to be operated by a single circuit, means for operating the same comprising an "up" and a "down" passenger-button for each floor and mechanism for and set by each button and a part moved correspondingly with the car and adapted to coöperate with said mechanisms to operate all said signaling devices in succession in each direction of movement of the car, said means also including mechanism rendering said moving part incapable of so coöperating with the "up" passenger-button set mechanisms when the car is moving down, and vice versa.

14. In an elevator signaling apparatus in combination, a car, a signaling device for each of a plurality of floors adapted to be operated by a single circuit, means for operating the same comprising an "up" and a "down" passenger-button for each floor and mechanism for and set by each button and a part moved correspondingly with the car and adapted to coöperate with said mechanisms to operate all said signaling devices in succession in each direction of movement of the car, said means also including mechanism rendering said moving part incapable of so coöperating with the "up" passenger-button-set mechanisms when the car is moving down, and vice versa, another car, and means coöperating individually thereto for restoring the said passenger-button-set mechanisms to normal condition.

15. In an elevator signaling apparatus in combination, a car, a signaling device for each of a plurality of floors, signaling circuits for said signaling devices, and commutator mechanism for controlling the same, and devices located at each floor adapted to be adjusted for rendering inoperative the signaling devices of the floors below.

16. In an elevator signaling apparatus, signaling devices for a plurality of floors, a commutator mechanism comprising contacts, separate circuits from the commutator mechanism to the floor signaling devices, a switch in the car adapted to break the circuit from all said floor signaling devices when opened, and a lamp in the car in parallel with the floor signaling devices, but connected between the switch and the floor signaling devices.

17. In an elevator signaling apparatus in combination, signaling circuits, signaling devices, commutator mechanism, a frame, plungers carried thereby, stationary contacts beneath said frame, said plungers and their frame traveling over said contact at all times in the same plane, and a contacting arm carried by and traveling with the frame, having a shoe adapted to contact with the plungers, and means for oscillating said arm on different directions of travel of said frame.

18. In an elevator signaling apparatus in combination, signaling circuits, signaling devices, commutator mechanism comprising a frame, plungers carried thereby, stationary contacts beneath said frame, said plungers and their frame traveling over said contact at all times in the same plane, and a contacting arm carried by and traveling with the frame, having a shoe adapted to contact with the plungers, and means for oscillating said arm on different directions of travel of said frame, said plungers being spring pressed against their contacts, and against said shoe so as to obtain different heights for contact with the shoe, but to maintain the same height for their contact with the stationary contacts.

19. In an elevator signaling apparatus in combination, a plurality of cars, signaling devices and circuits therefor, a single wire to each signaling device and mechanism controlled by the motion of the elevator for operating said single wire circuit upon both directions of travel of the car.

20. In an elevator signaling apparatus, in combination, a plurality of floors, an electrically operated signaling device corresponding to each floor and provided with means to give both up and down signals, up and down passenger-buttons at each floor, and means for operating a signaling device to give an up signal when an up passenger-button is operated and to give a down signal when a down passenger-button is operated, said means comprising a single electrical circuit for each signaling device.

21. In an elevator signaling apparatus, in combination, a plurality of floors, an electrically operated signaling device corresponding to each floor and provided with means to give both up and down signals, up and down passenger-buttons at each floor, and means for operating a signaling device to give an up signal when an up passenger-button is operated and to give a down signal when a down passenger-button is operated, said means comprising a single electrical circuit for each signaling device, and a single source of current for said several circuits.

22. In an elevator signaling apparatus, in combination, a plurality of floors, an electrically operated signaling device corresponding to each floor and provided with means to give both up and down signals, up and down passenger-buttons at each floor, and means for operating a signaling device to give an up signal when an up passenger-button is operated and to give a down signal when a down passenger-button is operated, said means comprising a single electrical circuit for each signaling device, and a pole changing mechanism for said circuits.

23. In an elevator signaling apparatus, in combination, a plurality of floors, an electrically operated signaling device corresponding to each floor and provided with means to give both up and down signals, up and down passenger-buttons at each floor, and means for operating a signaling device to give an up signal when an up passenger-button is operated and to give a down signal when a down passenger-button is operated, said means comprising a single electrical circuit for each signaling device, and a car for going up and down to said floors.

24. In an elevator signaling apparatus, in combination, a plurality of floors, an electrically operated signaling device corresponding to each floor and comprising polarized mechanism for giving both up and down signals, up and down passenger-buttons at each floor and means for operating a signaling device to give an up signal when an up passenger-button is operated and to give a down signal when a down passenger-button is operated, said means comprising a single electrical circuit for each signaling device.

25. In an elevator signaling apparatus, in combination, a plurality of floors, an electrically operated signaling device corresponding to each floor and comprising polarized mechanism for giving both up and down signals, up and down passenger-buttons at each floor and means for operating a signaling device to give an up signal when an up passenger-button is operated and to give a down signal when a down passenger-button is operated, said means comprising a single electrical circuit for each signaling device, and pole changing mechanism for said circuits.

26. In an elevator signaling apparatus, in combination, a plurality of floors, an electrically operated signaling device corresponding to each floor and comprising polarized mechanism for giving both up and down signals, up and down passenger-buttons at each floor and means for operating a signaling device to give an up signal when an up passenger-button is operated and to give a down signal when a down passenger-button is operated, said means comprising a single electrical circuit for each signaling device, a single source of current and pole changing mechanism for said circuits.

27. In an elevator signaling apparatus, in combination, a plurality of floors, an electrically operated signaling device corresponding to each floor and provided with means to give both up and down signals, up and down passenger-buttons at each floor, and means for operating a signaling device to give an up signal when an up passenger-button is operated and to give a down signal when a down passenger-button is operated, said means comprising a single electrical circuit for each signaling device, and a car for going up and down to said floors, and means for automatically canceling any given signal when a car has responded to said signal.

28. In an elevator signaling apparatus, in combination, a plurality of floors, an electrically operated signaling device at each floor provided with means to give both up and down signals, up and down passenger-buttons at each floor, means for operating a signaling device to give an up signal when an up passenger-button is operated and to give a down signal when a down passenger-button is operated, said means comprising a single electrical circuit for each signaling device, and a car for going up and down to said floors, a signaling device in the car, and means for operating the same simultaneously with the operation of a floor signaling device.

29. In an elevator signaling apparatus, in combination, a plurality of floors, an electrically operated signaling device at each floor provided with means to give both up and down signals, up and down passenger-buttons at each floor, means for operating a signaling device to give an up signal when an up passenger-button is operated and to give a down signal when a down passenger-button is operated, said means comprising a single electrical circuit for each signaling device, and a car for going up and down to said floors, a signaling device in the car, and means for operating the same simultaneously with the operation of a floor signaling device, comprising an electrical circuit in shunt with the single circuits of said several signaling devices at the floors.

30. In an elevator signaling apparatus, in combination, a car, a plurality of floors, an electrically operated signaling device corresponding to each floor, up and down passenger-buttons at each floor, and means controlled by said up and down passenger-buttons for operating said signaling devices, and means for preventing the operation of said signaling devices for one or more of said floors comprising devices adapted to be set at each floor to prevent the operation of said signaling devices for all floors below any such device which has been set.

31. In an elevator signaling apparatus, in combination, a car, a plurality of floors, an electrically operated signaling device corresponding to each floor, up and down passenger-buttons at each floor, and means controlled by said up and down passenger-buttons for operating said signaling devices, comprising electrical circuits to said signaling devices, and means for preventing the operation of said signaling devices for one or more of said floors comprising a common return wire in the electrical circuits of said signaling devices, a switch for opening a break in said return wire, and devices located at each floor adapted to operate said switch.

32. In an elevator signaling apparatus, in combination, a car, a plurality of floors, an electrically operated signaling device corresponding to each floor, up and down passenger-buttons at each floor, and means controlled by said up and down passenger-buttons for operating said signaling devices, comprising electrical circuits for said signaling devices, and means for preventing the operation of said signaling devices for one or more of said floors comprising a return wire for the several electrical circuits of said signaling devices, a switch located in the car, for opening a break in said return wire, and devices located at each floor adapted to be set for opening said switch when the car is below said floor and for closing said switch when the car is above said floor.

33. In an elevator signaling apparatus, in combination, a plurality of floors, a plurality of cars, a series of electrically operated signaling devices for each car, one signaling device corresponding to each floor, each signaling device provided with means to give both up and down signals, up and down passenger-buttons at each floor, and means for operating the signaling device for any floor to give an up signal when the corresponding car is approaching that floor in an up direction and the up passenger-button for that floor has been operated, and to give a down signal when the corresponding car is approaching that floor in a down direction and the down passenger-button for that floor has been operated, said means comprising a single electrical circuit for each signaling device.

34. In an elevator signaling apparatus, in combination, a plurality of floors, a plurality of cars, a series of electrically operated signaling devices for each car, one signaling device corresponding to each floor, each signaling device provided with means to give both up and down signals, up and down passenger-buttons at each floor, and means for operating the signaling device for any floor to give an up signal when the corresponding car is approaching that floor in an up direction and the up passenger-button for that floor has been operated, and to give a down signal when the corresponding car is approaching that floor in a down direction and the down passenger-button for that floor has been operated, said means comprising a single electrical circuit for each signaling device, and pole changing commutator mechanism for each car and operated thereby for completing circuits to said signaling devices for a current flow in one direction when the car is going up and for a current flow in the opposite direction when the car is going down.

35. In an elevator signaling apparatus, in combination, a plurality of floors, a plurality of cars, a series of electrically operated signaling devices for each car, one signaling device corresponding to each floor, each signaling device comprising an up indicator and a down indicator, and polarized actuating mechanism therefor, means for operating the signaling device for any floor to show an up indicator when the corresponding car is approaching that floor in an up direction and the up passenger-button for that floor has been operated, and to show a down indicator when the corresponding car is approaching that floor in a down direction and the down passenger-button for that floor has been operated, said means comprising a single electrical circuit for each signaling device, and pole changing commutator mechanism for each car and operated thereby for completing circuits to said signaling devices for a current flow in one direction when the car is going up and for a current flow in the opposite direction when the car is going down.

36. In an elevator signaling apparatus, in combination, a plurality of floors, a plurality of cars, a series of electrically operated signaling devices for each car one signaling device corresponding to each floor, each signaling device provided with means to give both up and down signals, up and down passenger-buttons at each floor, a potential signaling means controlled by each passenger-button, a single electrical circuit for each signaling device, and commutator mechanism for each car and operated thereby for completing signals from said potential signaling means to said signaling devices through said single circuits.

37. In an elevator signaling apparatus, in combination, a plurality of floors, a plurality of cars, a series of electrically operated signaling devices for each car, one signaling device corresponding to each floor, each signaling device comprising polarized mechanism for giving both up and down signals, up and down passenger-buttons at each floor, a potential signaling means controlled by each passenger-button, a single electrical circuit for each signaling device, and pole changing commutator mechanism for each car and operated thereby for completing signals from said potential signaling means for said signaling devices through said single circuits.

38. In an elevator signaling apparatus, in combination, a plurality of floors, a plurality of cars, a series of signaling devices for each car one signaling device corresponding to each floor, each signaling device provided with means to give both up and down signals, up and down passenger-buttons at each floor, a source of current, a potential signaling means controlled by each passenger-button, the several potential signaling means for the up passenger-buttons having circuit connections to one pole of said source of current and the potential signaling means for the down passenger-buttons having circuit connections to the other pole of said source of current, a single electrical circuit for each signaling device, and pole changing commutator mechanism for each car and operated thereby for making electrical connections to the operating circuits for said signaling devices from the potential signaling means of the up passenger-buttons when the car is going up and from the potential signaling means of the down passenger-buttons when the car is going down.

39. In an elevator signaling apparatus, in combination, a plurality of floors, a plurality of cars, a series of signaling devices for each car one signaling device corresponding to each floor, each signaling device provided with means to give both up and down signals, up and down passenger-buttons at each floor, a source of current, a potential signaling means controlled by each passenger-button, the several potential signaling means for the up passenger-buttons having circuit connections to one pole of said source of current and the potential signaling means for the down passenger-buttons having circuit connections to the other pole of said source of current, a single electrical circuit for each signaling device, and pole changing commutator mechanism for each car and operated thereby, comprising three series of contacts, the contacts of one series being electrically connected to the potential signaling means of said up passenger-buttons, the contacts of the second series being electrically connected with the potential signaling means of said down passenger-buttons, the contacts of the third series each being connected by a single wire to respective signaling devices, said pole changing commutator mechanism also comprising three common return contacts, one contact connected to one pole of said source of current, another contact connected with the other pole of said source of current, and the third contact connected with a common return wire for all of said signaling devices.

40. In an elevator signaling apparatus, in combination, a plurality of floors, a plurality of cars, a series of signaling devices for each car one signaling device corresponding to each floor, each signaling device provided with means to give both up and down signals, up and down passenger-buttons at each floor, a source of current, a potential signaling means controlled by each passenger-button, the several potential signaling means for the up passenger-buttons having circuit connections to one pole of said source of current and the potential signaling means for the down passenger-buttons having circuit connections to the other pole of said source of current, a single electrical circuit for each signaling device, and pole changing commutator mechanism for each car and operated thereby, comprising three series of contacts, the contacts of one series being electrically connected to the potential signaling means of said up passenger-buttons, the contacts of the second series being electrically connected with the potential signaling means of said down passenger-buttons, the contacts of the third series each being connected by a single wire to respective signaling devices, said pole changing commutator mechanism also comprising three common return contacts, one contact connected to one pole of said source of current, another contact connected with the other pole of said source of current, and the third contact connected with a common return wire for all of said signaling devices, said pole changing commutator mechanism also comprising means operated by said car for successively bridging the first and third series of said contacts when the car is moving in one direction and the second and third series of said contacts when the car is moving in the other direction.

41. In an elevator signaling apparatus, in combination, a plurality of floors, a plurality of cars, a series of signaling devices for each car one signaling device corresponding to each floor, each signaling device provided with means to give both up and down signals, up and down passenger-buttons at each floor, a source of current, a potential signaling means controlled by each passenger-button, the several potential signaling means for the up passenger-buttons having circuit connections to one pole of said source of current and the potential signaling means for the down passenger-buttons having circuit connections to the other pole of said source of current, a single electrical circuit for each signaling device, and pole changing commutator mechanism for each car and operated thereby, comprising three series of contacts, the contacts of one series being electrically connected to the potential signaling means of said up passenger-buttons, the contacts of the second series being electrically connected with the potential signaling means of said down passenger-buttons, the contacts of the third series each being connected by a single wire to respective signaling devices, said pole changing commutator mechanism also comprising three common return contacts, one contact connected to one pole of said source of current, another contact connected with the other pole of said source of current, and the third contact connected with a common return wire for all of said signaling devices, said pole changing commutator mechanism also comprising means operated by said car for successively bridging the first and third series of said contacts when the car is moving in one direction and the second and third series of said contacts when the car is moving in the other direction, and a common return pole-changer operated by said car to bridge said third common return contact with the first or second of said common return contacts for completing the circuit to said source of current.

42. In an elevator signaling apparatus, in combination, a plurality of floors, a signaling device corresponding to each floor comprising an up indicator and a down indicator, up and down passenger-buttons at each floor, means for operating a signaling device to show an up indicator when an up passenger-button is operated and to show a down indicator when a down passenger-button is operated, said means comprising a single electrical circuit for each signaling device.

43. In an elevator signaling apparatus, in combination, a plurality of floors, an electrically operated signaling device corresponding to each floor comprising an up indicating lamp and a down indicating lamp, up and down passenger-buttons at each floor and means for operating a signaling device to illuminate an up indicating lamp when an up passenger-button is operated and to illuminate a down indicating lamp when a down passenger-button is operated, said means comprising a single electrical circuit for each signaling device.

44. In an elevator signaling apparatus, in combination, a plurality of floors, a signaling device corresponding to each floor comprising an up indicator and a down indicator, up and down passenger-buttons at each floor, means for operating a signaling device to show an up indicator when an up passenger-button is operated and to show a down indicator when a down passenger-button is operated, said means comprising a polarized mechanism for each signaling device and a single electrical circuit therefor.

45. A pole changing commutator mechanism for elevator signaling systems comprising, in combination, three series of contacts arranged in parallel rows, and means for bridging successively the contacts of one row with the contacts of either of the other rows.

46. A pole changing commutator mechanism for elevator signaling systems comprising, in combination, three series of contacts arranged in parallel rows, and means for bridging successively the contacts of one row with the contacts of either of the other rows, comprising a carrier arranged to travel lengthwise along said rows and having conducting members movable laterally over said rows.

47. A pole changing commutator mechanism for elevator signaling systems comprising, in combination, three series of contacts arranged in parallel rows, and means for bridging successively the contacts of one row with the contacts of either of the other rows, comprising a carrier arranged to travel lengthwise along said rows of contacts and having contact engaging members for each row of contacts, and laterally movable conducting members mounted in said carrier for bridging different contacting engaging members at different times.

48. A pole changing commutator mechanism for elevator systems comprising, in combination, three series of contacts arranged in parallel rows, a screw shaft, a carrier moved by said screw shaft lengthwise of said rows of contacts, and having contact engaging members mounted therein for each row of contacts, a swinging frame traveling with said carrier and having a frictional bearing on said screw shaft for moving said frame laterally over said different rows of contacts, and conducting members carried on said swinging frame for bridging different contact engaging members of said carrier at different times.

49. In an elevator signaling apparatus, in combination, a car, a part moved in synchronism therewith, an electrical circuit, means for holding said circuit open while said car is moving and closing said circuit when said car stops, comprising a switch frictionally held open by said moving part, and springs for closing said switch when said moving part stops.

50. In an elevator signaling apparatus, in combination, a car, a part moved in synchronism therewith, an electrical circuit, means for holding said circuit open while said car is moving and closing said circuit when said car stops, comprising a switch having an arm frictionally held from its closing position by said moving part when moving in either direction, and springs at either side of said arm to return it to closing.

Signed at New York city, New York, this 30th day of January, in the year one thousand nine hundred and twelve.

CHARLES A. REINERS.

Witnesses:
F. WARREN WRIGHT,
FRED FRANCIS WEISS.